United States Patent [19]

Horn

[11] Patent Number: 4,941,629

[45] Date of Patent: Jul. 17, 1990

[54] SUPPORT DEVICE FOR A HOSE ADAPTER

[76] Inventor: Chris C. Horn, HCO 1 Box 16, Niland, Calif. 92257-9705

[21] Appl. No.: 368,552

[22] Filed: Jun. 20, 1989

[51] Int. Cl.⁵ ............................................. F16L 3/00
[52] U.S. Cl. ....................................... 248/62; 248/73; 248/315
[58] Field of Search ................. 248/62, 73, 74.1, 74.2, 248/74.4, 75, 77, 79, 312, 315, 339, 683, 689, 690, 692; 24/27, 230.5 W, 230.5 AD; 138/106, 107

[56] References Cited

U.S. PATENT DOCUMENTS

| 387,922 | 8/1888 | Schooley | 248/315 |
|---|---|---|---|
| 2,061,108 | 11/1936 | Shattow | 248/315 |
| 2,194,609 | 3/1940 | Miller | 248/339 |
| 2,576,873 | 11/1951 | Zelov | 248/315 |
| 2,874,430 | 2/1959 | Coldren | 24/27 |
| 3,960,232 | 6/1976 | Hubbell | 248/74.2 |
| 3,990,454 | 11/1976 | Schlesinger | 298/74.1 |

FOREIGN PATENT DOCUMENTS

| 228545 | 6/1960 | Australia | 248/315 |
|---|---|---|---|
| 663539 | 1/1965 | Belgium | 248/62 |
| 476616 | 12/1937 | United Kingdom | 248/315 |

Primary Examiner—Ramon O. Ramirez
Assistant Examiner—Robert A. Olson

[57] ABSTRACT

An accessory attachment is provided in two components for supporting one end of a recreational vehicle sewer hose while cleaning the hose after use. A first component is a circular adapter support ring having overlapping terminal ends. One of the terminal end projects outward to form a support hook. The adapter support ring is expandable for fitting onto the exterior of differently sized sewer hose adapters. A second component of the device is a ring support plate formed of a flat annular metal disc adapted for attachment to the exterior of a recreational vehicle. The ring support plate is designed to releasably hold the support hook with the ring attached to a hose adapter and hold a sewer hose opened end up allowing the user to wash out the sewer hose without having to manually support the hose.

2 Claims, 2 Drawing Sheets

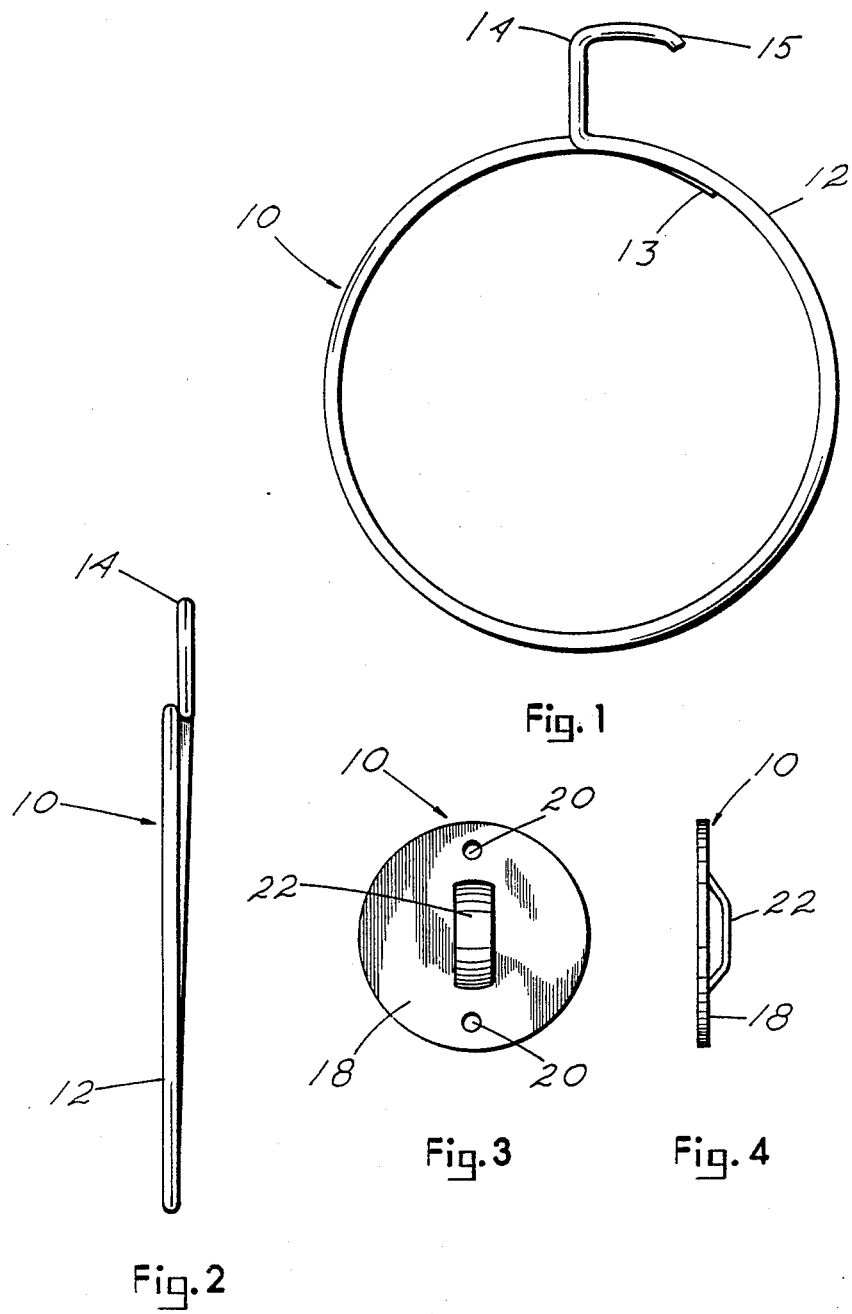

4,941,629

SUPPORT DEVICE FOR A HOSE ADAPTER

BACKGROUND OF THE INVENTION

1. Field of the Invention:

This invention relates to a device designed for supporting the end of a sewer hose of the type generally used for draining sewer holding tanks on self-contained recreational vehicles. The immediate invention is primarily useful as a hanger for attaching the hose adapter to a wall and in this manner supporting the hose end freed for cleaning after it has been used to empty the RV toilet holding tank.

2. Description of the Prior Art:

Of the large numbers of trailers and motor homes in use today, practically all of the larger ones are equipped with sewer holding tanks. These holding tanks must be occasionally emptied into a specified dumping station or sewer inlet. For this purpose, flexible, expandible sewer hose is normally used for attachment between the RV holding tank drain outlet and the sewer inlet. Motor homes and trailers usually carry sections of the flexible sewer hose with them. To prevent odor and for sanitary reasons, these sections of sewer hose require cleaning after use. The present invention is provided as a hose supporting fixture for use during this cleaning. The invention actually works in conjunction with a hose attachment fitting of which several are usually carried in the motor home or trailer for sewer line attachment purposes. The fitting for attaching the sewer line to the holding tank outlet is called an adapter. After use, the sewer hose and adapter must be cleaned, generally by rinsing with water. The unattached adapter end of the sewer hose must be supported above the remainder of the hose or there will be danger of backwash. The present invention is adapted through a unique ring and hanger arrangement to provide end support for the flexible sewer hose during cleaning.

There appears to be nothing available or published as past art structured similar to my device or offered specifically for supporting RV drain sewer hose for use during cleaning.

SUMMARY OF THE INVENTION

Therefore, in practicing my invention, I have provided a two piece accessory attachment for supporting the terminal end of a sewer hose while cleaning. Although my hose support is applicable for attachment and for supporting a variety of drain hoses in which an adapter is used, my device is directed primarily towards use on motor home and trailer drain hoses for cleaning after use. In my device, I provide an annular metal or plastic ring which fits behind the lip of an RV sewer hose adapter. The adapter remains in the end of the sewer hose after use and detachment from the sewer holding tank outlet. For cleaning, the end of the sewer hose is usually turned over or up, and a hook end of my ring can be releasably attached to a hanger plate affixed on the exterior wall of the vehicle. This holds the adapter and the hose end in an upward position allowing washing down the hose and cleaning off the adapter. When cleaning is completed, my ring can be left on the adapter for storage and reuse when needed or removed if the vehicle owner so chooses.

Therefore, it is a primary object of my invention to provide a support attachment for the terminal end of a sewer hose for easy cleaning.

Another object of my invention is to provide a support attachment for sewer hose which can be left indefinitely attached to both respective locations thereby avoiding the misplacement of the individual pieces.

A further object of my invention is to provide a support attachment for sewer hose which is adjustable for various sizes of adapter fittings.

A still further object of my invention is to provide a support attachment for sewer hose which is inexpensive to manufacture, easy to install, and simple to use.

Additional objects and the many advantages of my device will become apparent by reading the remaining specification and comparing numbered parts described with like numbered parts illustrated in the accompanying drawings.

BRIEF DESCRIPTION OF THE DRAWINGS

FIG. 1 is a frontal view of the adapter support ring.

FIG. 2 is an side view thereof.

FIG. 3 is a frontal view of the ring support plate.

FIG. 4 is a side view thereof.

DESCRIPTION OF THE PREFERRED EMBODIMENT

Figure 5:
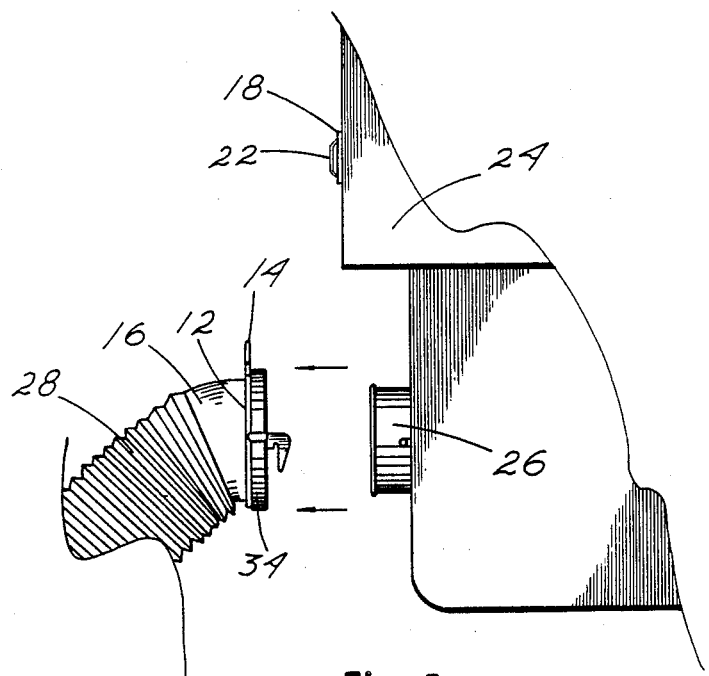
FIG. 5 is a side view showing the adapter support ring attached to an adapter which is connected to a sewer hose. The adapter is shown just after detachment from the RV holding tank drainage outlet on the side of the vehicle.

Referring now to the drawings and to FIGS. 1, 2, 3, and 4 where features of adapter support 10 are illustrated with 10 used generally to indicate the complete invention. Adapter support 10 is comprised of two separable members, expandable ring 12 and ring support plate 18 shown in FIG. 1 and FIG. 3 respectively. In FIG. 1, expandable ring 12, the adapter 16 attachment member of adapter support 10, is shown in a frontal view and in FIG. 2, in a side view. In FIG. 3, ring support plate 18, a hook hanger for affixing to the side of a vehicle wall, is shown in a frontal view and in FIG. 4, in a side view. Expandable ring 12 has two terminal ends, first terminal end 13 and second terminal end 15. The intersect upward with terminal end 15 extended and formed into hook 14. Hook 14 is best seen in FIG. 1. Intersecting of the ring ends 13 and 15 can best be seen in FIG. 3. A resilient material is used in the structure of expandable ring 12 which allows it to be pulled open and snapped around the external circumferential surface of adapter 16 behind adapter lip 34 as shown in FIG. 5. The resilient material used in the structure of expandable ring 12 provides original dimension memory and also allows the ring to adjust in size to slightly different external circumferential surfaces of hose adapters 16. Ring support plate 18 is fastened to vehicle 24, on the side wall above holding tank drainage outlet 26 by bolts or screws through plate attachment apertures 20. Ring support plate 18 is centrally affixed by hook hanger 22, a bridged opening providing passageway for hook 14 to be removably hooked to hook hanger 22.

Figure 6:
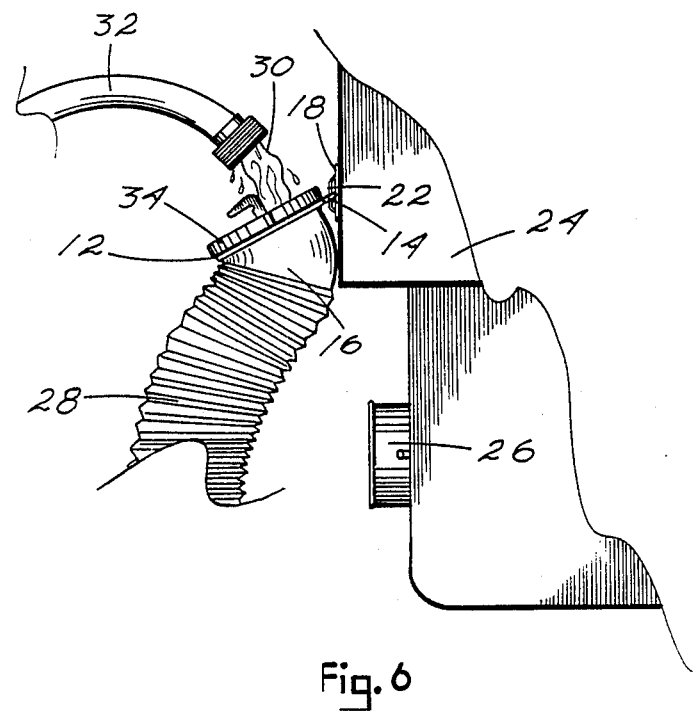
FIG. 6 shows the adapter support ring attached to the ring support plate and holding the adapter and sewer hose end upward for easy cleaning with a water hose.

Ready for use, see FIG. 5, expandable ring 12 is snapped over adapter 16 behind adapter lip 34. Ring support plate 18 is attached to the wall of vehicle 24 by screws or other suitable means through plate attachment apertures 20. Adhesives or welding may also be used to attach ring support plate 18 to the wall of the RV 24. In FIG. 5, adapter 16, a hollow angled tubular fitting, is attached into sewer hose 28, usually a flexible hose as shown. Adapter 16 has been detached from holding tank drainage outlet 26 and sewer hose 28 is ready to be turned over for cleaning. In FIG. 6, sewer hose 28 has been turned over, hook 14 is attached releasably through the bridge-like passageway formed in ring support plate 18 by hook hanger 22 and is supporting sewer hose 28 with the opened end of adapter 16 facing upwards and outward. In this retained position, sewer hose 28 can be washed out by flushing with water 30 from hose 32 and adapter 16 can be washed off in the same operation.

Although both components of this invention have been described and illustrated as having a specific structural design, it is obvious that alterations and modifications can be practiced in both components without affecting their intended function. I therefore reserve the right to practice such modifications as long as those changes remain within the scope of the appended claims and changes made by others obviously within the intended scope of my claims, I will consider to be my invention.

What I claim as my invention is:

1. A support device for a recreational vehicle sewer hose adapter, comprising:

(a) an expandable ring having intersecting terminal ends;
   (b) a hook formed supplemental in a continuation of one of said terminal ends, which hook extends outwardly from the ring and lies generally in the same plane as the ring;
   (c) structural resilience in said expandable ring allowing forced circumferential enlargement of said expandable ring maintained generally circular with said structural resilience providing return of said expandable ring to a remembered circumferential dimension;
   (d) a ring support plate attachable to said recreational vehicle with said ring support plate having a protruding cover providing a through passageway behind said cover, said passageway adapted for releasable locking attachment of said hook with said ring fitted around the hose adapter.

2. The invention defined in claim 1 wherein said hook formed supplemental in a continuation of one of said terminal ends of said ring includes said hook configured as a generally vertically disposed continuation of one said terminal end of said ring evolving into a straight member horizontally disposed right angled to said vertically disposed continuation, said hook having a downwardly angled stub end provided in said straight horizontally disposed member for locking said hook removably affixed in said passageway in said ring support plate.

* * * * *